Patented Aug. 13, 1929.

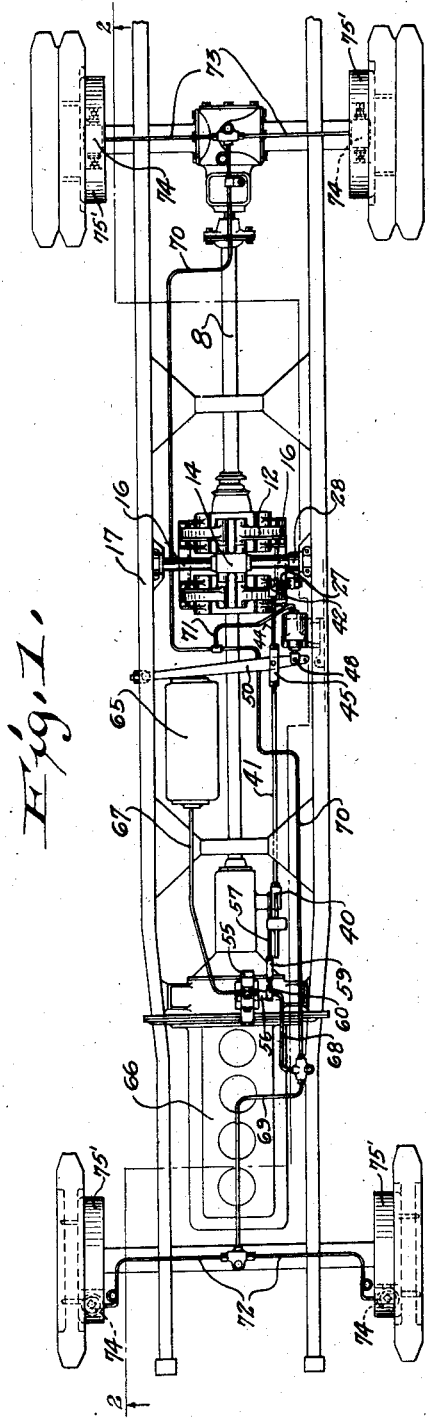

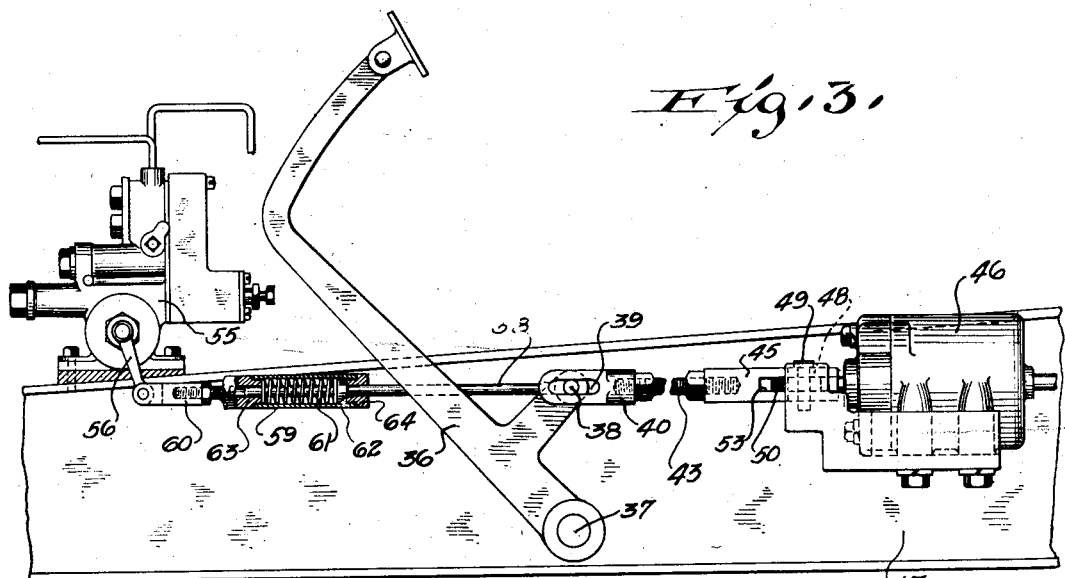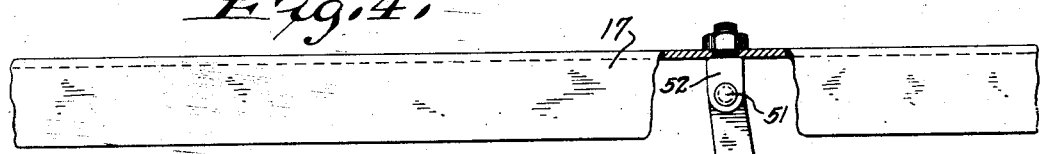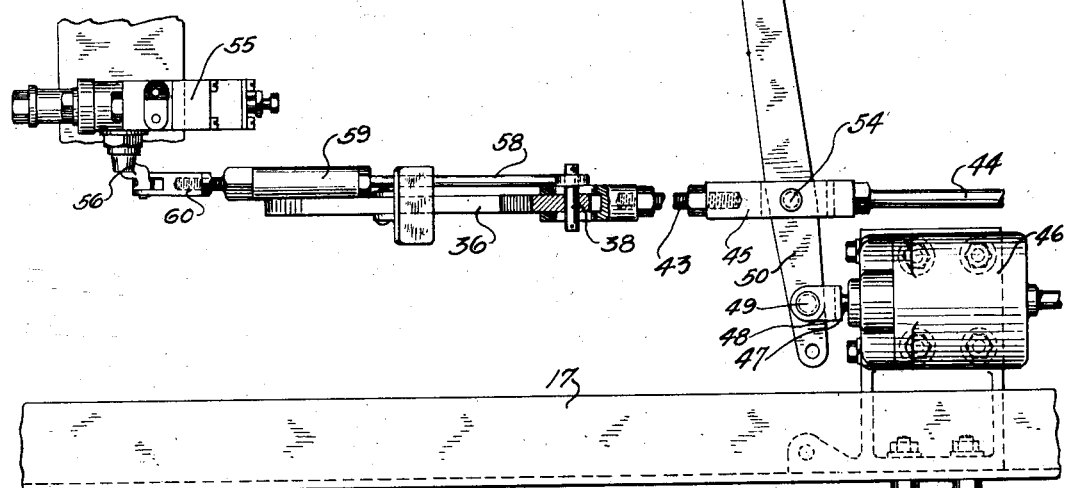

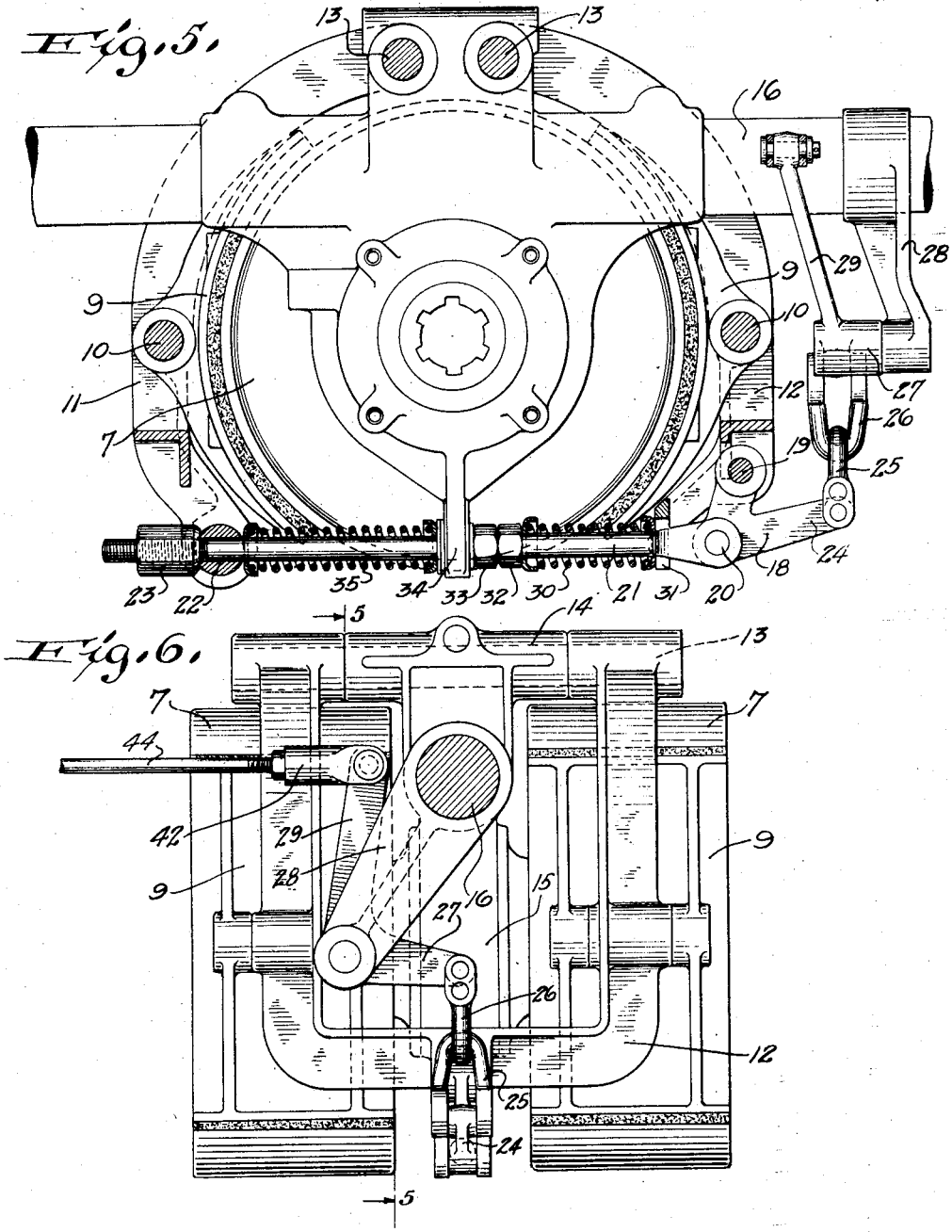

1,724,127

UNITED STATES PATENT OFFICE.

NIELS A. CHRISTENSEN, OF MILWAUKEE, WISCONSIN.

BRAKE SYSTEM.

Application filed May 16, 1925. Serial No. 30,832.

The invention relates to brake mechanism for automotive vehicles.

The object of the invention is to provide a brake system for automotive vehicles in which control valve mechanism for the fluid-pressure-operated brakes, including a transmission brake, is associated with a foot-pedal which is also connected with the transmission brake for direct operation of said brake by the operator, should the fluid-pressure in the brake system fail for any reason.

The invention further consists in the several features hereinafter set forth and more particularly defined by claims at the conclusion hereof.

In the drawings: Fig. 1 is a plan view of a brake system embodying the invention;

Fig. 2 is a section taken on the line 2—2 of Fig. 1, the engine, transmission box and reservoir, shown in Fig. 1, being omitted;

Fig. 3 is an enlarged elevation view of certain parts shown in Fig. 1, with parts shown in section;

Fig. 4 is a plan view of the parts shown in Fig. 3;

Fig. 5 is a detail sectional view taken on the line 5—5 of Fig. 6;

Fig. 6 is an enlarged elevation view of the transmission brake.

Referring to Figs. 1, 5 and 6, the transmission brake herein shown includes a pair of brake drums 7 arranged in spaced relation on the transmission shaft 8. Each of these drums has a pair of brake shoes 9 associated therewith. Each shoe 9 carries a pin 10 intermediate its ends. A yoke 11 has the pins 10 for the shoes on one side of the drums pivotally mounted in it, and a yoke 12 has the pins 10 for the shoes on the other side of the drums pivotally mounted in it. The yokes 11 and 12 are carried on shafts 13, each pivotally mounted on a frame 14 which also provides a bearing 15 for the shaft 8 and which is mounted on a shaft or frame member 16 secured at its ends to the main frame 17 of the automotive vehicle.

A lever 18 is pivotally connected at one end by a pin 19 to the lower end of yoke 12 and is pivotally connected by a pin 20 to a rod 21 extending through a bore in a pivot pin 22 on the yoke 11. The rod 21 has a nut 23 adjustably mounted thereon and engageable with the pin 22. An arm 24 of the lever 18 is connected by clevis links 25 and 26 to one arm of a bell crank lever 27 pivotally mounted on a pin on an arm 28 carried by the shaft 16. The other arm 29 of the lever 27 is adapted to be operated as hereinafter described, either by manual or fluid-pressure-operated means.

With this construction, when the arm 29 is swung toward the left the links 25 and 26 are moved upward and this movement causes the lever 18 to swing the yoke 12 inwardly and at the same time exert a pull on the rod 21 to swing the yoke 11 inwardly toward the drum, with the result that the brake shoes 9, associated with these yokes, are applied to the drums. For releasing the shoes 9 on one side of the drums, a spring 30 is interposed between a lug 31 on the yoke and a nut 32 on the bar 21 adjacent a nut 33 abutting a lug 34 on the frame 14, and for releasing the shoes on the other side of the drums a spring 35 is interposed between said lug 34 and the pin 22. The release position of the yoke 11 is determined by the adjustment of the nuts 23, 32 and 33.

Referring to Figs. 1 to 4, inclusive, of the drawings, the numeral 36 designates a foot-pedal, which may be, and preferably is, the usual brake pedal of the vehicle, pivotally mounted at 37 and provided with a pin 38 mounted in slot 39 in the end member 40 of a link 41 whose other end member 42 is operatively connected to the arm 29 of the lever 27. This link 41 also includes rods 43 and 44 respectively adjustably secured to said end members through screw and nut connections therewith, and adjustably secured to an intermediate member 45 in a similar manner. Thus, when the foot-pedal is moved downward, the pin 38 is moved to the outer end of the slot 39 and then the link 41 is moved forwardly, swinging the lever 29 in the manner previously described to make a brake application. This is the operation that takes place on the manual operation of the transmission brake.

In order to operate the transmission brake by fluid-pressure, I provide a brake cylinder 46 mounted on the frame of the vehicle and having a suitably packed piston (not shown), of known construction, working therein with its piston rod 47 projecting from the cylinder and having a forked head 48 pivotally secured by a pin 49 to the free end of a lever 50. The lever 50 is pivotally mounted at 51 on a bracket 52 secured to one of the side members of the frame 17 and passes through a slot 53 in the member 45 to which it is pivotally connected intermediate its ends by a pin 54. Thus, when fluid-pressure is admitted to the brake cylinder 46 it will act on the piston therein, causing it to move the rod 47 outwardly and through the lever 50 produce a pull on the link 41 similar to the pull exerted by the downward movement of the pedal 36 by the operator, with the result that the lever 29 is moved to effect an application of the transmission brake.

In order to bring about this action of the brake cylinder 46, the foot-pedal 36 is associated with control valve mechanism 55, which is more particularly shown and described in my United States Letters Patent No. 1,588,660, dated June 15, 1926. This mechanism includes a crank arm 56 which is associated, as shown in the aforementioned patent, with the inlet and exhaust valves of the brake system, the swinging of this arm serving to operate said valves. The arm 56 is operatively connected with the pin 38 by a link 57 of the type which allows relative motion between the pedal 36 and the parts it actuates, and is shown as formed by a rod 58 connected to the pin 38, a cylinder 59 having a forked head member 60 secured thereto and pivotally connected to the free end of the arm 56. A spring 61 is mounted within the cylinder 59 between a seat member 62 on the rod 58 and the end 63 of the cylinder, the rod 58 being slidably mounted in a bore in the end 63 and a bore in the end cap 64 of said cylinder. By this construction the movement of the rod 58 by the pedal is transmitted through the spring 61 to the other part of the link, including the cylinder, so that the link may move as a unit to operate the control valve mechanism through the swinging of the arm 56, and when said arm has reached the end of its travel further movement of the foot-pedal will cause the rod 58 to move relative to the cylinder 59 and in opposition to the spring 61.

As in the aforementioned patent, the compressed air reservoir 65, which is supplied with compressed air in any suitable manner, as by a compressor (not shown) driven by the engine 66, is connected by a pipe 67 with the control valve mechanism, and when the inlet valve (not shown) thereof is opened by the forward swing of the arm 56, compressed air is admitted into the brake system and upon the return of said arm the exhaust valve (not shown) of said control mechanism is opened to release the air in the brake system. The brake system includes pipes 68, 69, 70 and 71, the pipe 68 communicating with the pipes 69 and 70, and the pipe 71 communicating with the pipe 70 and with the head end of the brake cylinder 46. The pipe 69 has branch pipes 72 and the pipe 70 has branch pipes 73 leading to the fluid-pressure-operated brake cylinders or motors 74, of the opposed piston type, which act upon the free ends of the brake bands 75 associated with the brake drums 75' on the front and rear wheels. Each brake band is connected intermediate its ends by a link 76 to a support 76' on the steering knuckle or rear axle housing, and is released by springs 77 and 78. A further detailed showing of this brake mechanism will be found in my United States Letters Patent No. 1,619,970, dated March 8, 1927.

As the particular brake mechanism for the front and rear wheels forms the subject-matter of other applications heretofore filed by me, and as the system herein contemplates the use of any suitable brake mechanism associated with these wheels, further description thereof is not deemed necessary.

From the foregoing description it will be noted that when the operator depresses the foot-pedal 36 the linkage 57 swings the arm 56 to admit air into the brake system and hence into the brake cylinder 46, with the result that the link 41 is operated, as previously described, to apply the transmission brake. Owing to the lost motion connection between the pin 38 and the member 40, by reason of the slot 39, the first motion of the foot-pedal will take up the usual slack in the lever system for the transmission brake, but at or before the time this slack is taken up, the control valve mechanism will have been moved by the link 57 into a position so as to admit air into the cylinder 46 as well as the cylinders 74, so that the compressed air operates the transmission brake and the front and rear wheel brakes. As this application takes place, the slot 39 takes care of the forward travel of the link 41, due to the air brake pressure, and as the air brake pressure is always stronger than the foot pressure this lost motion will always cause the outer end of the slot 39 to keep in advance of the pin 38 so as to leave the foot-pedal free to be manipulated for the air brake application and release only.

However, when, for any reason, there is a failure of air pressure in the brake system, the foot-pedal will be moved forward to take up the slack and the transmission brake will be applied through the foot-pedal, as first described, by direct pull on the brake rod or link 41 without the assistance or intervention of air pressure. The foot-pedal travel for manual application of the brake is, in most cases, longer than when the air brakes are applied so that when the mechanism of the foot-pedal control valve has reached the limit of its travel the lost motion action of the link 57 comes into play, it being noted that the spring 61 is of sufficient strength to permit a unitary movement of said link and yet sufficiently weak that it can be readily compressed by the motion of the foot-pedal in the manual application of the shaft or transmission brake so as to leave the brake rod 41, on a manual application, free to travel its full length without in any way injuring the working parts of the foot control valve. Since the first movement of the brake rod 44 by the brake cylinder 46 acts to take up slack in the transmission-brake-operating means, and since the fluid-pressure motors for the vehicle wheels act directly on their brake members, the brakes for these wheels will be applied before the transmission brake is applied.

The transmission brake may be located adjacent the rear axle housing, as shown and described in my copending application, Serial No. 715,752, filed May 24, 1924.

I desire it to be understood that this invention is not to be limited to any particular form or arrangement of parts except in so far as such limitations are specified in the claims.

What I claim as my invention is:

1. In a brake system for automotive vehicles, the combination of a transmission brake, and wheel brakes, of fluid-pressure-operated mechanism for actuating said wheel brakes, fluid-pressure-operated mechanism for actuating said transmission brake, and control-valve mechanism common to both fluid-pressure-operated mechanisms, said fluid-pressure-operating mechanism for the wheel brakes operating to apply said wheel brakes in advance of the application of said transmission brake.

2. In a brake system for automotive vehicles, the combination of a fluid-pressure-operated transmission brake and fluid-pressure-operated front and rear wheel brakes, control-valve mechanism common to all of said brakes, operating means for said control valve mechanism, and mechanical means associated with said operating means and said transmission brake permitting a manual operation of said transmission brake.

3. In a brake system for automotive vehicles, the combination of fluid-pressure-operated front and rear wheel brakes including brake cylinders for each wheel brake having direct thrusting connection with the brake member for said wheel, a transmission brake, a fluid-pressure-operated motor, linkage connecting said last named motor to said transmission brake, manually-operated means associated with said linkage, control valve mechanism common to all of said brake cylinders, and operating means for said control valve mechanism associated with said manually operable means.

4. In a brake system for automotive vehicles, the combination with fluid-pressure-operated wheel brakes including brake cylinders, a transmission brake, a fluid-pressure-operated brake cylinder associated with said transmission brake, control valve mechanism for said brake cylinders, operating means for said control valve mechanism including an arm, a foot pedal and a yieldable link between said arm and foot pedal, and a connection between said foot pedal and said transmission brake for manually operating the same, including a lost motion linkage permitting normal operation of said control valve mechanism.

In testimony whereof, I affix my signature.

NIELS A. CHRISTENSEN.